UNITED STATES PATENT OFFICE.

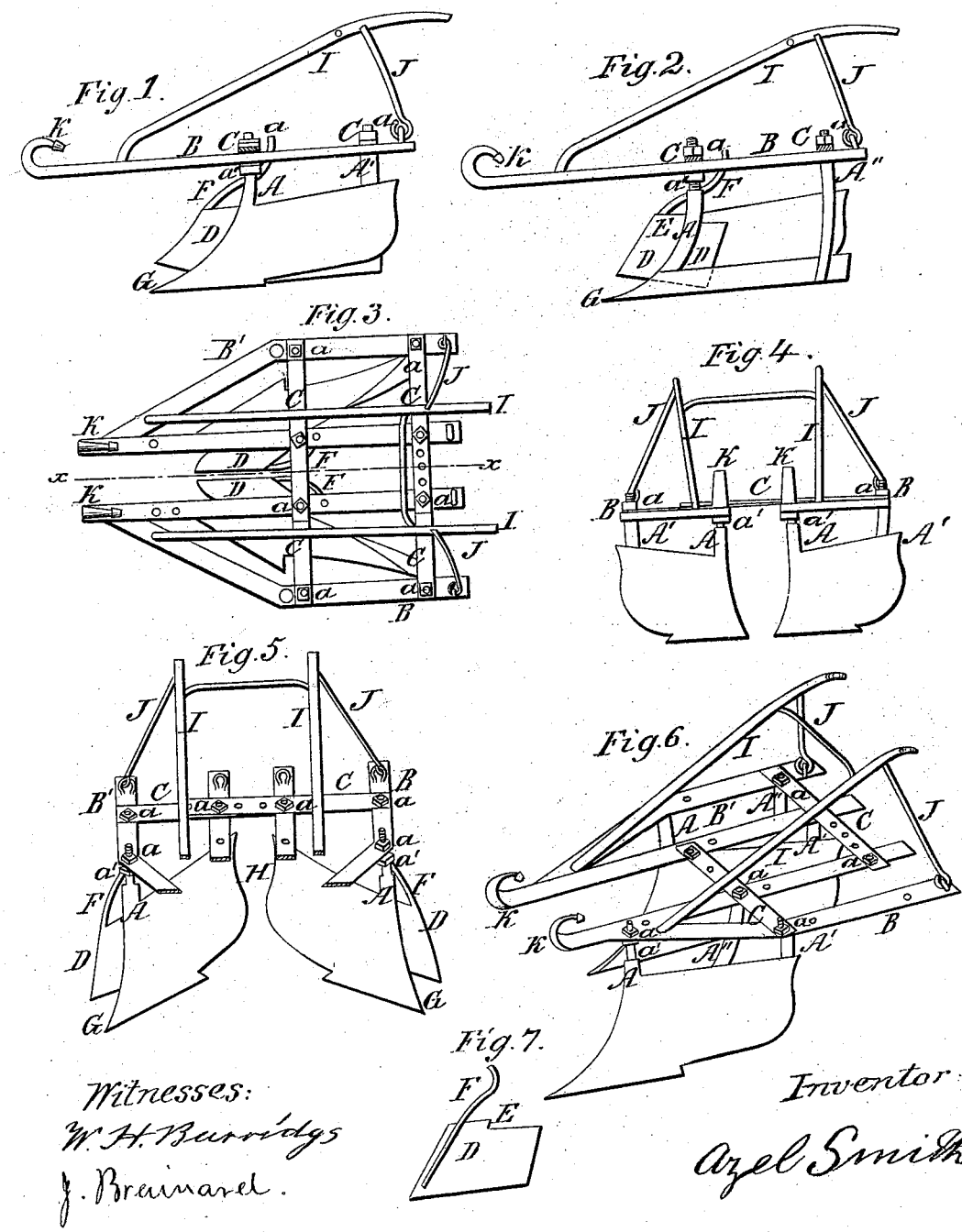

AZEL SMITH, OF WESTFIELD, OHIO.

IMPROVEMENT IN CULTIVATORS.

Specification forming part of Letters Patent No. 24,411, dated June 14, 1859.

*To all whom it may concern:*

Be it known that I, A. SMITH, of Westfield, in the county of Medina and State of Ohio, have invented certain new and useful Improvements in Combined Double Plows and Cultivators; and I do hereby declare that the following is a full, clear, and exact description thereof, reference being had to the annexed drawings, making part of this specification, in which—

Figure 1 is a side view of the plow and cultivator combined. Fig. 2 is a side view of the right-hand section in the direction of the line $x\,x$ in Fig. 3, which constitutes a right-hand plow. Fig. 3 is a top view of Fig. 1. Figs. 4 and 5 represent different changes of Figs. 1 and 3. Fig. 6 represents a double plow; and Fig. 7, a detached section, which will be noted in description hereinafter.

Like letters denote like parts in the several views before mentioned.

This combined plow and cultivator is so constructed that it may be readily changed from one form of cultivator to another or to several kinds of plows.

The mold-boards and points may be arranged in any convenient manner, to which and the landside are attached three standards, A A′ A″. The standard A is connected to the point, and A′ to the mold-board, and A″ to the landside, as seen in Figs. 1 and 2. The upper ends of the standards pass through the frame B B′ and plates C C, and which are secured together by the screw-nuts $a$, Fig. 3.

To the standard A are attached two nuts, one above the frame, and one, $a'$, below it, by which the points of each plow may be raised or lowered, so that the earth will be plowed or cultivated deep or light, as may be required.

The two frames B B′ are connected together by the plates C C. The plate from the frame B extends over to the frame B′, and the plate from the frame B′ extends to the frame B. In these plates are a series of holes, through which the standards pass, and as the plates or braces on each frame are not in one piece, but extend over from one frame to the other, and attached only at the upper ends of the standards by the screw-nuts, it follows that the plows and cultivators may be secured at any proper distance apart by means of these plates, in connection with the screw-nuts and standards. The plates are provided with holes for the purpose of extending or contracting the distance between the two plows.

Fig. 4 represents the two plows separated a certain distance, but secured together by aforesaid plates C C. The two sections may be brought in close contact, so as to form a shovel-plow or cultivator, and when arranged in the position seen in Fig. 3 it may be used as a weeder, in which case the cutters D D are connected to the points by sliding the back end of the cutter into slot between the standard A and the mold-board until the shoulder E of the cutter rests against the standard, as seen in Fig. 2. From each cutter extends a bar or brace, F, which is attached the frame, and which aids in securing the cutters in place. It will be noted in Figs. 1 and 2 that the cutters are above the ground-line and the points G, which points may be set a certain distance apart, so as to not disturb the roots of the plant, but at the same time break up the surface of the ground and remove the weeds. The outer edges of the cutters are closer together than the points G, but far enough apart to allow the young plant to pass between the cutters; and as the points or edges of the cutters are above the points G, the roots of the plants will not be disturbed, as the space between the points G and the edge of the cutters will form an opening or passage for the roots of the young plants, while the plant itself will pass in the space between the cutters. At the same time the cutters will work up close to the plants, and cut up and remove the weeds from them to the center of the rows, in combination with the plows or cultivators. This mode of weeding should of course be done when the plant is young.

In cases where the plant has grown some eight or ten inches high the cutters may be removed and the cultivator used, as seen in Fig. 4, for the purpose of weeding, and by bringing these two plows close together a cultivator is readily formed.

When corn or other plants have grown so high as not to pass under the frame weeding may be done by arranging the parts as seen in Fig. 5, in which case the mold-boards are reversed in their position—viz, the one on the right hand in Fig. 4 is placed on the left in Fig. 5, and the one on the left in Fig. 4 is placed to the right in Fig. 5, the cutters D D being connected to the plows, as before, the holes in the frame and plates being so arranged as to receive the shanks of the plows when arranged in any position herein set forth. When arranged as in Fig. 5 and used as a weeder it will weed two sides of two rows at the same time, the plants being on the outside of the weeder. In this way the weeds are cut up from the sides and conveyed to the center of the rows, Fig. 5. It may also be used as a cultivator for young plants by first removing the cutters C C. In this case a plow would be on each side of a row, and the plants would pass through the opening H between them. By this means the earth would be taken from the center of two rows at one time and conveyed to the side of the row, which would be the same in effect as hoeing.

Fig. 6 represents an arrangement for a double plow, viz: The left-hand plow in Fig. 3 is placed farther forward, as in Fig. 6, and secured to the frame, as before. The right-hand plow is then removed and a left-hand plow attached in its place, as seen in Fig. 6, which makes a double left-hand plow, the distance between the plows being increased by the plates C C, as before stated.

In case a double right-hand plow may be required, the left-hand plow in Fig. 3 is only removed, and a right-hand plow is attached in its place to the frame B, in the position of the forward plow in Fig. 6. This arrangement makes a double right-hand plow, which may be so separated as to constitute two distinct plows, either right or left handed, as may be needed.

In all these various changes the holes in the frames and the plates C C are so arranged as to render it easy and convenient to make the changes from one implement to another.

I represents the handles of the machine, and J braces connecting the handles to the frames K on hooks for the attachment of the doubletrees or clevis.

What I claim as my improvement, and desire to secure by Letters Patent, is—

The adjusting brace-plates C C, frames B B', and cutters D D, when arranged as described and in combination with the adjustable mold-boards, in the manner and for the purposes hereinbefore specified.

AZEL SMITH.

Witnesses:
J. BRAINERD,
W. H. BURRIDGE.